Aug. 26, 1930.  F. W. ESSLINGER  1,773,978
HEATING DEVICE FOR AUTOMOBILE MOTORS
Filed July 17, 1929   2 Sheets-Sheet 1
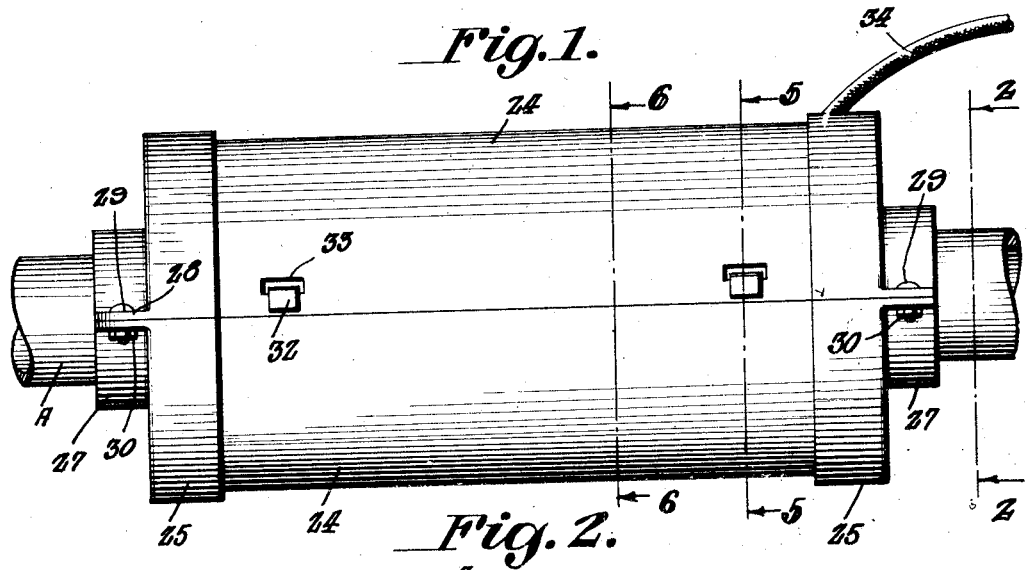
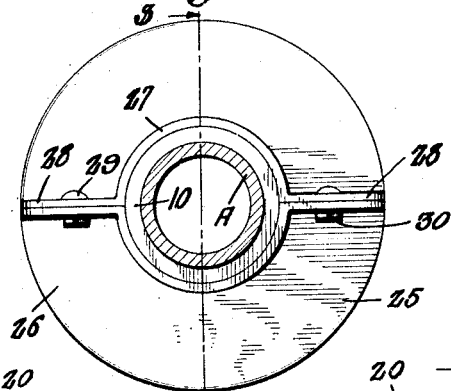
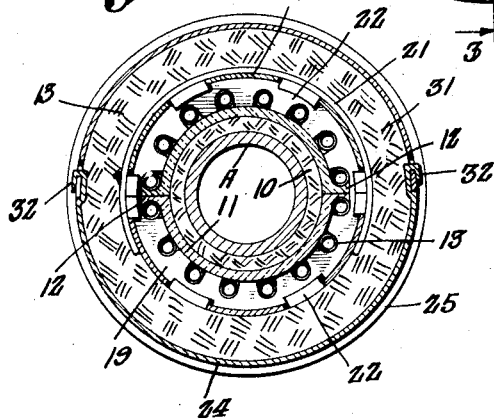
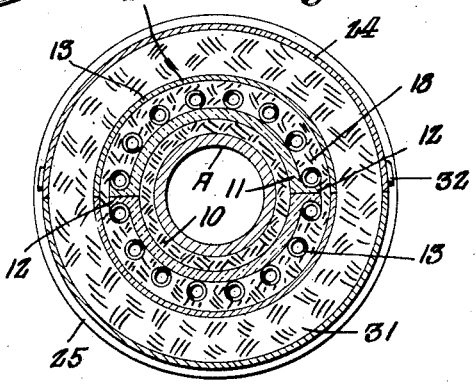
Fred W. Esslinger,
INVENTOR
BY Victor J. Evans
ATTORNEY Aug. 26, 1930.  F. W. ESSLINGER  1,773,978
HEATING DEVICE FOR AUTOMOBILE MOTORS
Filed July 17, 1929    2 Sheets-Sheet 2

Fred W. Esslinger, INVENTOR

BY Victor J. Evans ATTORNEY

Patented Aug. 26, 1930

1,773,978

UNITED STATES PATENT OFFICE

FRED W. ESSLINGER, OF ANN ARBOR, MICHIGAN

HEATING DEVICE FOR AUTOMOBILE MOTORS

Application filed July 17, 1929. Serial No. 379,057.

This invention relates to electrical heating devices, particularly those adapted or intended for use in connection with motor vehicles, and has for its object the provision of a novel device adapted to be mounted upon the pipe leading from the radiator to the water jacket of an automobile and utilizing electric current for the purpose of providing heat which will operate not only to keep the water circulation system open and avoid freezing but which will also prevent congealing of the oil and insure proper fluidity and flow of the oil in the lubrication system when the motor is first started.

It is well known that in many severe climates it is necessary to keep an automobile in a well heated garage in order to prevent congealing or hardening of the oil in the lubricating system. As it is not always convenient to heat a garage adequately it is the principal purpose of the present invention to provide an electrical heat which may be plugged into the garage lighting circuit and which will operate to produce a sufficient heating effect to keep the oil in the lubricating system in a flowable condition and also positively prevent any freezing of the water in the radiator or water jacket of the motor of the car.

An important object of the invention is to provide a device of this character which may be mounted permanently and directly upon either of the pipes which lead from the radiator to the water jacket of the motor and which may be plugged into an ordinary house lighting circuit socket, by means of a suitable connection, whenever it is desired to raise the temperature or maintain an elevated temperature of the water and consequently the oil in the motor.

Another object is to provide a device of this character which need not require any special attention other than the plugging of the terminal member into an outlet in the lighting circuit.

A further object is to provide a device of this character which may be easily formed in similar or complementary sections adapted to be easily engaged upon such a water connection without the employment of any special knowledge or tools.

An additional object is to provide a device of this character which will be simple and inexpensive to make, easy to install, positive in action, efficient and durable in service, and a general improvement in the art.

With the above and other objects and advantages in view, the invention preferably consists in the details of construction and the arrangement and combination of parts to be hereinafter more fully described and claimed, and illustrated in the accompanying drawings, in which:—

Figure 1 is a side elevation of the device in completely assembled position.

Figure 2 is a cross sectional view taken on the line 2—2 of Figure 1.

Figure 5 is a cross section taken on the line substantially 5—5 of Figure 1.

Figure 6 is a cross sectional view taken on the line 6—6 of Figure 1.

Figure 3:
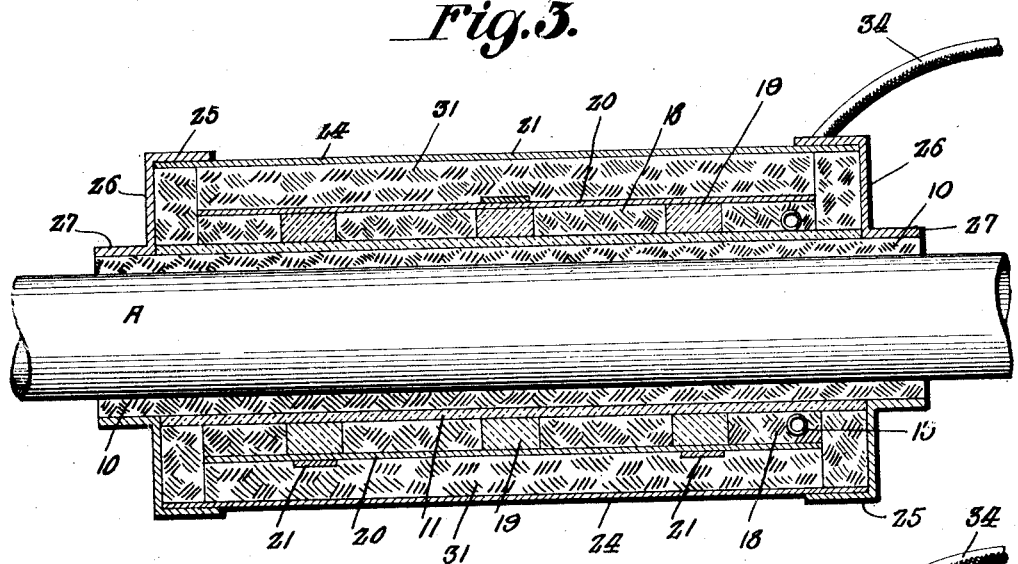
Figure 3 is a longitudinal sectional view taken on substantially the line 3—3 of Figure 2.
Figure 4:
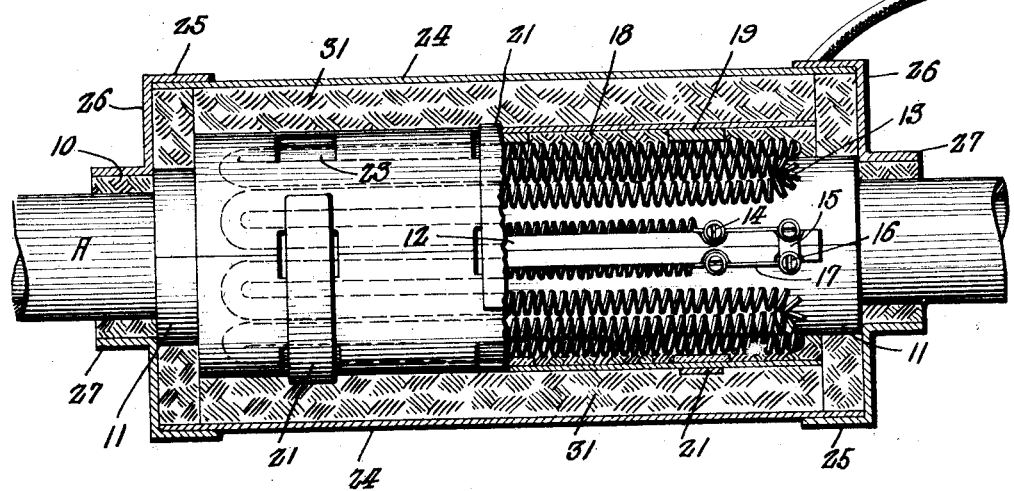
Figure 4 is a longitudinal sectional view taken at right angles to Figure 3.

Referring more particularly to the drawings, the letter A designates the pipe which extends between the radiator and water jacket of the motor of an automobile and it is this pipe which it is contemplated to heat so as to keep the water and consequently the water jacket, motor and oil warm. Surrounding and spaced from the pipe A by means of suitable packing 10, which may be mineral wool, asbestos or the like, in the form of a mass, layer or wrapping is a two-part shell member 11 formed of complementary sections having outstanding transversely curved or concaved flanges 12 at their meeting edges. Each of the sections of the casing 11 is provided externally with a resistance unit each of which is shown as comprising a coil of suitable resistance wire wound back and forth longitudinally upon the section 11 in serpentine fashion as clearly indicated in Figure 4. The ends of the coils are anchored to suitable terminal elements indicated 14. The different lengths of the coil itself are indicated at 13. It is of course obviously necessary to connect the two coils after assembly and it is for this reason that I have illustrated what may be called a metallic bridge member 15 secured on the side of the casing 11 by screws 16 to which are connected conductors 17 leading to the terminal elements 14. The space about and the spaces between the successive lengths or stretches of the coils 13 are preferably filled in with heat insulating material indicated at 18. Filler elements 19 are also provided exteriorly of the casing 11 and operate to space away a shell member 20 which is held in position by a plurality of interrupted spring metal bands 21 which are snapped onto the shell member 20 and which are held against displacement by inwardly projecting lugs 22 passing through openings 23 in the shell member.

Located outwardly of the shell 20 and arranged in spaced relation thereto is an outer shell 24 telescopically engaged at its ends within sectional flange members 25 or heads which have inwardly projecting portions 26 constituting closing means for the ends of the device, these inwardly projecting portions terminating in opposed outwardly extending flanges 27 which closely embrace the packing layer 10. The members 25 are formed in sections and are provided with coacting flanges 28 at the reduced or inner portion 27, these flanges being secured together by means of bolts 29 and nuts 30. The space about the shell member 20 and between it and the shell member 24 and the spaces within the members 25 are all filled with suitable heat insulating packing material indicated at 31. It should also be mentioned that the outer shell 24 is applied in the same manner as a wrapper and is held in place partly by the flange members or heads 25 and partly by means of metal tongues 32 which are passed through slots 33 and then bent over as clearly illustrated in Figure 1. Of course a conducting cable 34 must be provided for bringing current into the coils 13 as will be readily understood.

The device is applied to the pipe A by first placing the insulating layer 10 about the pipe, then placing the casing sections 11 in position, applying the metal bridge member 15 and conductors 17, then applying the packing and spacing members about the casing 11, placing the casing 20 in position, snapping on the bands 21, then covering the casing 20 with insulating material 31, and then applying the sectional outer casing or shell 24 together with the heads 25 which are bolted in place by means of the bolts 29 and nuts 30. When current is then supplied to the resistance coils it is of course apparent that they will become heated and will generate sufficient heat to warm the water passing through the pipe A. This will maintain a constant circulation and absolutely prevent freezing of the water. However, the anti-freeze solution used is generally sufficiet for this purpose, and it is therefore the principal feature of this invention that the motor itself is kept warm so that the oil will not congeal but will remain in a fluent condition even when the motor is first started. This fluidity of the oil is of great advantage as it insures proper lubrication and prevents damage to the bearings for lack thereof.

From the foregoing description and a study of the drawings it is believed that the construction, operation and advantages will be readily apparent to one skilled in the art without further explanation.

While I have shown and described the preferred embodiment of the invention, it should be understood that I reserve the right to make all such changes in the details of construction as well as in the arrangement and combination of parts as will not depart from the spirit of the invention or the scope of the subjoined claims.

Having thus described the invention, I claim:—

1. A heating device for the pipe connecting the radiator with the water jacket of an automobile motor, comprising a sectional casing adapted to be disposed and secured in embracing relation to the pipe, a resistance unit carried by the casing, a plurality of concentric shells surrounding the resistance unit and separated by insulating material, and heads engaging exteriorly upon the outermost shell, the resistance unit comprising separate coils arranged in serpentine fashion upon the respective casing sections and connected together.

2. A heating device for the pipe connecting the radiator with a water jacket of an automobile motor, comprising a sectional casing adapted to be disposed and secured in embracing relation to the pipe, a resistance unit carried by the casing, a plurality of concentric shells surrounding the resistance unit and separated by insulating material, and heads engaging exteriorly upon the outermost shell, the resistance unit comprising a pair of coils of wire arranged in serpentine fashion longitudinally upon the exterior of the casing sections respectively, and means for connecting said coils.

3. A heating device for the pipe connecting the radiator with the water jacket of an automobile motor, comprising a sectional casing adapted to be disposed and secured in embracing relation to the pipe, a resistance unit carried by the casing, a plurality of concentric shells surrounding the resistance unit and separated by insulating material, heads engaging exteriorly upon the outermost shell, the resistance unit comprising a pair of coils of wire arranged in serpentine fashion longitudinally upon the exterior of the casing sections respectively, and means for connecting said coils comprising terminal elements on the casing sections to which the ends of the coils are attached, and a metallic bridge piece mechanically and electrically connected with said terminal elements.

In testimony whereof I affix my signature.

FRED W. ESSLINGER.